Patented Oct. 29, 1946

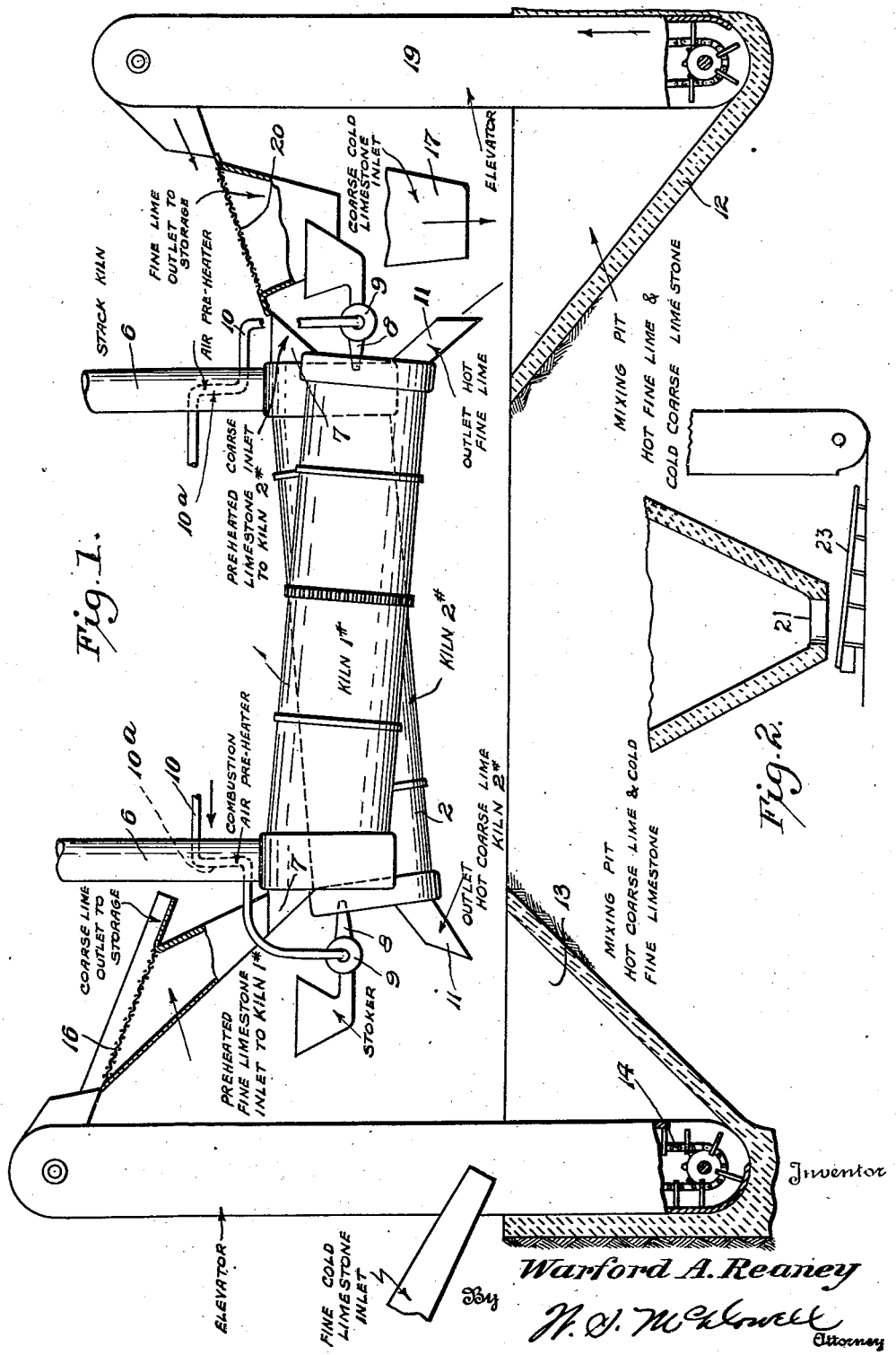

2,410,236

UNITED STATES PATENT OFFICE 2,410,236

METHOD AND APPARATUS FOR HEAT-TREATING LOOSE BULK MATERIALS

Warford A. Reaney, Delaware, Ohio

Application June 27, 1945, Serial No. 601,763

8 Claims. (Cl. 263—22)

This invention relates to an improved process and apparatus adapted particularly for effecting the calcination of calcareous materials, such as limestone, marl or the like, a general object of the invention being to provide a new and improved process and apparatus by which such calcination may be carried out with greater thermal efficiency than heretofore has been obtainable.

In the production of lime from limestone, it is the ordinary practice to pass limestone through a rotary kiln. While in the kiln, the limestone is fired to temperatures in the order of 1400 to 2000 degrees F. Such burning of the limestone liberates its carbon dioxide content, leaving calcium oxide or lime as the calcined product. The heated lime upon its discharge from the kiln is cooled and thereafter crushed to a required degree of fineness suitable for various uses. In this customary operation, the heat contained in the calcined lime is lost to the atmosphere and is not applied to any useful purpose.

Accordingly, it is another object of the invention to utilize more efficiently the available heat in hot calcined lime by bringing the latter, immediately upon its discharge, from a calcining kiln into direct and intimate contact with an unheated body of limestone being charged to a calcining operation so that the charging material will be preheated by contact with the hot lime before being introduced into the calcining kiln.

It is still another object of the present invention to provide a lime-calcining system in which two or more rotary kilns are arranged in adjacent order with the positions of their material-receiving and discharging ends reversed with respect to each other, so that the hot lime discharged from one of said kilns may be conveniently brought into direct contact with cold limestone being fed as a charging material to the inlet end of the other of said kilns.

A further object is to provide a system of this character in which crushed limestone of fine mesh is employed as a charging material for one of the duplex kilns and a coarser lime fed as the charging material to the other kiln whereby, through a screening operation, to provide for the separation of finished lime from the kiln-charging limestone following heat-exchanging admixture thereof.

Still, a further object of the invention is to provide a lime-calcining system in which additional heat economies are obtained by disposing in or adjacent to the combustion gas outlet of the kiln a heat exchanging means for preheating air employed in sustaining fuel combustion within the kilns.

The present invention constitutes a continuation-in-part of the disclosures set forth in my prior application, Serial No. 491,962, filed June 23, 1943.

A further understanding of the invention will be obtained by reference to the following description and the accompanying drawing.

In said drawing:

Fig. 1 illustrates in schematic form a typical system for carrying out the invention;

Fig. 2 is a detail view showing a slightly modified form of heat-exchanging pit.

The apparatus disclosed in the accompanying drawing comprises a pair of kilns, indicated at 1 and 2, said kilns being preferably of the rotary drum type. The drum of each kiln is mounted as usual, with its longitudinal axis slightly angular to the horizontal, each drum being supported and rotated by conventional means. The upper or material-receiving end of each of the kiln drums enters a vertical flue or waste gas outlet stack, shown at 6, the lower portion of each stack being provided with a limestone receiving chute 7. Partially crushed limestone, for example, of such particle size that it will pass through a 2½ inch to 1¼ inch mesh screen, is delivered to the chute 7 of the kiln 1 in a manner hereinafter defined, while crushed limestone of finer particle size such as that which would pass through a screen of 1 inch to ½ inch mesh is delivered to the inlet chute 7 of the kiln 2. The hot lime discharging end of each kiln is provided with a fuel burner 8 and the fan or blower 9 of each of these burners has its air inlet side connected with a duct system 10. A portion of this system, forming a heat exchanger 10a, is disposed in each of the stacks 6, so that the air employed for fuel combustion purposes in the kilns will be preheated by the waste gases for more efficient utilization in the kilns.

The outlet end of each kiln is formed with a lime-discharging chute 11, the latter being arranged over a pair of mixing pits shown at 12 and 13 in order that the hot lime discharged from said kilns may be directly received within said pits. The hot lime of coarser particle size discharged from the kiln 2 is received in the pit 13, and is there brought into heat exchanging contact or relationship with crushed cold limestone of finer particle size. By this operation, the temperature of the limestone is raised to preheat the fine limestone before it is introduced into the inlet chute of the kiln 1.

After such heat exchange has taken place, the coarse lime is separated from the smaller sized particles of preheated limestone. Advantageously, this may be accomplished by providing the pit 13 with a conveyor type elevator 14, the upper or discharge end 15 of this elevator being disposed in registration with an inclined screen 16, so that as the mixture of coarse lime and fine limestone passes over the screen, the fine preheated limestone will pass through the meshes of the screen for delivery to the inlet chute of the kiln 1. The coarser lime gravitates to the lower end of the screen and from that point is conducted in any suitable manner to a position of storage.

A corresponding arrangement is provided for introducing the coarse limestone into the kiln 2. Coarse limestone in an unheated state and at a controlled rate of flow is dropped into the pit 12 from a valved spout 17, where the coarse limestone comes into intimate heat exchanging relationship with the hot lime of fine particle size discharged from the lime outlet 11 of the kiln 1. As this mixture of lime and limestone of different particle size gravitates to the bottom of the pit 12, the same is engaged by the conveyor elevator 19 and lifted thereby for deposit on an inclined screen 20. The mesh of this screen is such that as the mixture passes thereover, the calcined lime of fine particle size will pass through the screen for delivery to storage as a finished product, while the preheated coarse limestone will be discharged from the lower end of the screen 20 into the inlet chute of the kiln 2.

Thus, by utilizing the dual kilns, each handling limestone of determined particle size and differing from that handled by the other, I am enabled to obtain thermal efficiencies and economies substantially in excess of systems now in general use for the purpose set forth.

Thus the hot lime, while it possesses its highest temperature, and immediately upon its discharge from the kilns, is brought into intimate admixture with the charging limestone, usefully absorbing the heat of the lime and minimizing heat losses in a system of this kind. Another advantage accruing from the dual and reversely disposed kilns is the fact that combustion air, used in sustaining fuel combustion, may be effectively preheated in the gas outlet stack of each kiln and by a short transfer line delivered to the fuel burner of each adjacent kiln. If the dual kilns were not used, the transfer line for the preheated air would necessarily extend the full length of a single kiln, and heat losses therefore would be such as to render the air-preheating element inefficient.

As shown in Fig. 2, the bottom of the heat-exchanging pits, in which a bed of heat-exchanging lime and limestone is maintained, may be funnel-shaped to maintain intimate engagement between the hot lime and limestone, and the restricted outlet 21 of the pit may be arranged immediately over the table of a vibratory feeder 23, by which the heated materials may be fed by a controlled feed to the elevator.

In summary, it will be evident that the present invention provides a system or mechanical process whereby hot burned lime, discharged from each of two rotary kilns placed in adjacent order with their material-receiving and discharging ends reversed, acts as a preheating medium for the cool limestone charged to each opposite kiln, and whereby the flue or stack gases of each of the two kilns serves to preheat the fuel and intake combustion air of each opposite kiln.

I claim:

1. Process for heat-treating materials, which comprises advancing a stream of materials of relatively coarse particle size through a confined heating zone, simultaneously therewith advancing a second stream of materials of relatively finer particle size through a separate heating zone, bringing the heated materials discharged from each of said zones into direct heat-exchanging and preheating relationship with previously unheated materials of a particle size differing from that of both said streams of materials destined for delivery to each of the other zones, and separating the preheated materials from the finally heated materials prior to the introduction of the preheated materials into their respective heating zones.

2. Process for heating dry bulk materials differing in particle size which comprises advancing a stream of materials of relatively coarse particle size through a confined heating zone, simultaneously therewith advancing a second stream of such materials possessing a finer particle size through a separate heating zone, bringing the heated materials discharged from said zones into direct heat-exchanging and preheating relationship with the unheated materials undergoing charging advancement to said zones, and screening the preheated zone-charging materials from the finally heated materials prior to the introduction of said charging materials into their respective heating zones.

3. Process for heat treating loose bulk granular materials differing in particle size which comprises advancing a stream of such materials composed of relatively large or coarse particles through a heating kiln, simultaneously therewith advancing a second stream of such materials possessing relatively smaller and finer particle size through a second heating kiln, bringing the finally heated materials discharged from each of said kilns into direct heat exchanging relationship with the previously unheated charging materials undergoing delivery to each of said kilns, and following such commingling of the heated and unheated materials, separating the charging materials from the finally heated materials and delivering the preheated charging materials to their respective kilns.

4. Process for burning limestone, comprising placing limestone of relatively coarse particle size through a kiln which is maintained at such temperatures as to effect calcination of the limestone, simultaneously therewith passing limestone of relatively fine particle size through a second kiln maintained at calcination temperatures, admixing the hot calcined lime of coarse particle size immediately upon its discharge from said first kiln with quantities of unheated limestone of fine particle size and which serves as the charging material for the second-named kiln, subjecting said admixture to a screening operation to remove in a separated state the preheated limestone of fine particle size, delivering such preheated fine limestone to the inlet of the second-named kiln, admixing with the hot calcined lime of fine particle size discharged from said second kiln with bodies of unheated limestone of coarse particle size, screening said last-named admixture to remove the calcined lime of fine particle size therefrom, and delivering the preheated coarse limestone to the inlet of said first-named kiln.

5. Process for heat-treating loose bulk materials, which comprises advancing a stream of such materials composed of particles relatively coarse in size through a confined heating zone, simultaneously therewith advancing a second stream of such materials composed of particles of finer size through a separate heating zone, admixing with the hot coarse materials immediately upon their discharge from the first-named heating zone quantities of unheated material of fine particle size, the latter constituting the charging material for the second heating zone, following heat exchange between said admixed materials screening the same to separate the heat treated materials of coarse particle size from the preheated finer materials and delivering the latter to said second-named heating zone, admixing with hot materials of fine particle size immediately upon their discharge from the said second-named heating zone quantities of unheated coarse material to preheat the latter material, prior to its delivery to the inlet side of the first-named heating zone, and screening said last-named admixture to remove therefrom the heated material of fine particle size and delivering the preheated material of coarse particle size to the first-named heating zone.

6. A process of heat treating materials as defined in claim 5 and wherein the material streams advancing through the separate heating zones move longitudinally in opposite directions with respect to each other.

7. A process whereby hot burned lime discharged from each of two rotary kilns placed in juxtaposition with their receiving and discharge ends reversed, acts as a preheating medium for the charging limestone of each opposite kiln, and whereby simultaneously the flue gases of each of the two kilns so placed acts as the preheating element for the fuel and intake combustion air of each opposite kiln.

8. In combination, a pair of juxtaposed, cylindrical kilns disposed with the material receiving end of one kiln adjacent the material discharging end of the other, a fuel burner of the blast type at the material discharging end of each kiln, a stack at the material receiving end of each kiln, and an air conduit in heat exchange relation with the gases passing through the stack of each kiln, said conduit delivering air directly to the burner of the other kiln, whereby such air is preheated, and travels over a relatively short path.

WARFORD A. REANEY.